United States Patent
Lukac

(10) Patent No.: US 8,824,826 B2
(45) Date of Patent: Sep. 2, 2014

(54) METHODS FOR PERFORMING FAST DETAIL-PRESERVING IMAGE FILTERING

(75) Inventor: Rastislav Lukac, San Jose, CA (US)

(73) Assignee: Foveon, Inc., Santa Clara, CA (US)

( * ) Notice: Subject to any disclaimer, the term of this patent is extended or adjusted under 35 U.S.C. 154(b) by 373 days.

(21) Appl. No.: 13/072,324

(22) Filed: Mar. 25, 2011

(65) Prior Publication Data

US 2012/0219215 A1 Aug. 30, 2012

Related U.S. Application Data

(60) Provisional application No. 61/446,274, filed on Feb. 24, 2011.

(51) Int. Cl.
*G06K 9/40* (2006.01)

(52) U.S. Cl.
USPC .......................... 382/264; 382/260; 382/261

(58) Field of Classification Search
USPC .......................... 382/264, 162, 165
See application file for complete search history.

(56) References Cited

U.S. PATENT DOCUMENTS

| | | | | |
|---|---|---|---|---|
| 5,390,264 A * | 2/1995 | Ishihara et al. | ............... | 382/260 |
| 5,408,338 A * | 4/1995 | Koike | ............... | 358/448 |
| 5,561,724 A * | 10/1996 | Kido et al. | ............... | 382/264 |
| 5,819,035 A * | 10/1998 | Devaney et al. | ............... | 709/202 |
| 6,665,448 B1 * | 12/2003 | Maurer | ............... | 382/261 |
| 6,731,821 B1 * | 5/2004 | Maurer et al. | ............... | 382/263 |
| 6,950,130 B1 * | 9/2005 | Qian | ............... | 348/239 |
| 6,980,696 B2 * | 12/2005 | Maurer | ............... | 382/262 |
| 7,277,590 B2 * | 10/2007 | Ghosh et al. | ............... | 382/260 |
| 7,327,882 B2 * | 2/2008 | Wang et al. | ............... | 382/181 |
| 7,747,045 B2 * | 6/2010 | Chinen et al. | ............... | 382/118 |
| 8,401,266 B2 * | 3/2013 | Xu et al. | ............... | 382/131 |
| 2003/0035580 A1 * | 2/2003 | Wang et al. | ............... | 382/176 |
| 2003/0053708 A1 * | 3/2003 | Kryukov et al. | ............... | 382/261 |
| 2004/0247198 A1 * | 12/2004 | Ghosh et al. | ............... | 382/260 |
| 2005/0036704 A1 * | 2/2005 | Dumitras et al. | ............... | 382/260 |
| 2005/0041883 A1 * | 2/2005 | Maurer et al. | ............... | 382/260 |
| 2010/0232654 A1 * | 9/2010 | Rahmes et al. | ............... | 382/117 |
| 2011/0040183 A1 * | 2/2011 | Yoshida | ............... | 600/443 |
| 2011/0235938 A1 * | 9/2011 | Lin | ............... | 382/264 |
| 2012/0106815 A1 * | 5/2012 | Yang et al. | ............... | 382/131 |
| 2012/0219215 A1 * | 8/2012 | Lukac | ............... | 382/165 |

OTHER PUBLICATIONS

Sapiro, Guillermo, "Anisotropic Diffusion of Multivalued Images with Applications to Color Filtering", Nov. 1996, Image Processing, IEEE Transactions on, vol. 5, Issue: 11, p. 1582-1586.*

Joachim Weickert, "Anisotropic Diffusion in Image Processing", 1998, p. 1-184.*

(Continued)

*Primary Examiner* — Gandhi Thirugnanam
(74) *Attorney, Agent, or Firm* — The Webb Law Firm

(57) ABSTRACT

A method for performing fast detail-preserving filtering of an input digital image includes, for each pixel in the image, calculating the difference between the selected pixel and each of its four neighboring pixels located above, left, right, and below the selected pixel, calculating a scaled weighted sum of differences between the actual pixel and its four neighbors, where for each neighboring pixel the weight is an edge-sensing function having a data-adaptive scaling parameter function, and adding the weighted sum of differences to the value of the selected pixel.

6 Claims, 4 Drawing Sheets

(56) References Cited

OTHER PUBLICATIONS

Perona, Pietro et al., "Scale-Space and Edge Detection Using Anisotropic Diffusion", Jul. 1990, vol. 12 No. 7, "IEEE Transactions on Pattern Analysis and Machine Intelligence", p. 629-639.*

Nezamoddin N. Kachouie, Anisotropic Diffusion for Medical Image Enhancement, International Journal of Image Processing (IJIP), vol. 4, No. 4, p. 436-443, 2010.*

Alvarez, L. et al, Image Selective Smoothing and Edge Detection by Nonlinar Diffusion II, SIAM Journal of Numerical Analysis, Jun. 1992, vol. 29, No. 3, pp. 845-866.

Black, M.J. et al., "Robust Anisotropic Diffusion", IEEE Transactions on Image Processing, Mar. 1998, vol. 7, No. 3, pp. 421-432, IEEE, New York, NY.

Catte F. et al., "Image selective smoothing and edge detection by nonlinear diffusion", SIAM Journal on Numerical Analysis, Feb. 1992, vol. 29, No. 1, pp. 182-193.

Gerig, G. et al., Nonlinear Anisotropic Filtering of MRI Data, IEEE Transactions on Medical Imaging, Jun. 1992, vol. 11, pp. 221-232.

Gilboa G. et al., "Anisotropic Selective Inverse Diffusion for Signal Enhancement in the Presence of Noise", Proc. IEEE ICASSP-2000, Jun. 2000, vol. 1, pp. 211-224, held in Istanbul, Turkey.

Gilboa G. et al., Signal and Image Enhancement by a Generalized Forward-and-Backward Adaptive Diffusion Process, EUSIPCO-2000, Sep. 2000, held in Tampere, Finland.

Perona, P. et al., "Scale-Space and Edge Detection Using Anisotropic Diffusion", IEEE Transactions on Pattern Recognition and Machine Intelligence, Jul. 1990, vol. 12, No. 7, pp. 229-639, IEEE, New York, NY.

Smolka, B. et al., Application of Forward and Backward Anisotropic Diffusion Framework to Color Image Denoising, Proceedings of the 9th International Workshop on Systems, Signals, and Image Processing IWSSIP'03 held in Prague, Czech Republic, Sep. 2003, pp. 195-198.

Smolka, B. et al., Modified Anisotropic Diffusion Framework, Proceedings of SPIE, Jul. 2003, vol. 5150, pp. 1657-1666.

Weickert, J. "Anisotropic Diffusion in Image Processing", 1998, Stuttgart-Germany, Teubner-Verlag.

Whitaker, R. et al., "Vector-valued diffusion" in Geometry-Driven Diffusion in Computer Vision, 1994, pp. 93-134, Kluwer Academic Press.

Li, X. et al., Nonlinear Diffusion with Multiple Edginess Thresholds, Pattern Recognition, 1994, vol. 27, No. 8, pp. 1029-1037, Pergamon Press.

* cited by examiner

METHODS FOR PERFORMING FAST DETAIL-PRESERVING IMAGE FILTERING

CROSS-REFERENCE TO RELATED APPLICATIONS

This application claims the benefit of U.S. Provisional Patent Application Ser. No. 61/446,274, filed Feb. 24, 2011.

BACKGROUND

1. Field of the Invention

The present invention relates to image processing. More particularly, the present invention relates to image filtering and specifically to fast detail-preserving image filtering.

2. The Prior Art

A digital image with R rows and S columns can be seen as a two-dimensional array of pixels $x_{(r,s)}$, where $r=1, 2, \ldots, R$ and $s=1, 2, \ldots, S$ denote the row and column coordinates, respectively. The input image can be processed by the traditional anisotropic diffusion filter as follows:

$$x_{(r,s)}^{[i+1]} = x_{(r,s)}^{[i]} + \lambda \sum_{(g,h) \in \zeta} [f(x_{(r,s)}^{[i]}, x_{(g,h)}^{[i]}) \cdot (x_{(r,s)}^{[i]} - x_{(g,h)}^{[i]})] \quad (1)$$

where i denotes the iteration index, with i=0 indicating the input (unprocessed) image. The term $\zeta=\{(r-1,s),(r,s-1),(r,s+1),(r+1,s)\}$ denotes the neighboring pixels located above, left, right, and below with respect to the pixel location (r,s) under consideration. The term $f(\cdot)$ denotes the edge-sensing function which can be defined as follows:

$$f(a,b) = \frac{1}{1+(a-b)^2/\kappa^2} \quad (2)$$

where $\kappa$ is a predetermined parameter, for example, set as $\kappa=2$.

The filtering procedure first selects the actual pixel $x_{(r,s)}$ to be filtered. Then, the four neighbors for $x_{(g,h)}$, for $(g,h) \in \zeta$ and $\zeta=\{(r-1,s),(r,s-1),(r,s+1),(r+1,s)\}$, located above, left, right, and below with respect to the pixel location (r,s) under consideration are selected. Note that the pixel location above, left to, right to and below the actual location (r,s) are indicated as (r−1,s), (r,s−1), (r,s+1), and (r+1,s), respectively. Then, the difference between $x_{(r,s)}$ and each of its four neighbors is calculated; these four differences are indicated as $x_{(r,s)}^{[i]} - x_{(g,h)}^{[i]}$, for $(g,h) \in \zeta$. Each of these four differences is associated with the weight $f(x_{(r,s)}^{[i]}, x_{(g,h)}^{[i]})$ calculated using Equation (2). Once the differences and weights are obtained, the actual pixel $x_{(r,s)}$ is adjusted by adding to its value the value of $\lambda \cdot \Sigma[f(x_{(r,s)}^{[i]}, x_{(g,h)}^{[i]}) \cdot (x_{(r,s)}^{[i]} - x_{(g,h)}^{[i]})]$ which represents the weighted sum of differences between the actual pixel and its four neighbors, the sum is scaled by the parameter, $\lambda$ which controls the level of this adjustment.

The filtering process then moves to next pixel location and executes the above procedure. The procedure is repeated in all pixel locations of the input image until all pixels are processed. This gives one iteration, which is indicated in Equation (1) using index [i+1] where [i] refers to the input image (for i=0) or the image obtained in previous iteration (for i>0).

Anisotropic diffusion is an iterative filtering process; reasonable quality of the filtered image is usually achieved after a number of iterations, which may not be suitable for real-time processing. This iterative processing requires performing Equation (1) in each pixel location of the input image to produce an image to be used as the input in the subsequent iteration.

BRIEF DESCRIPTION

A method for performing fast detail-preserving filtering of an input digital image includes, for each pixel in the image, calculating the difference between the selected pixel a and each of its four neighboring pixels located above, left, right, and below the selected pixel, calculating a scaled weighted sum of differences between the actual pixel and its four neighbors, where for each neighboring pixel b the weight is an edge-sensing function having a data-adaptive scaling parameter function, and adding the weighted sum of differences to the value of the selected pixel a.

According to one aspect of the present invention, the weight may be $$f(a,b) = \frac{1}{1+(a-b)^2/\kappa(a,b)^2};$$

and $\kappa(\cdot)$ is the data-adaptive scaling function.

According to another aspect of the invention, $\kappa(\cdot)$ may be a function using the pixel under consideration to estimate noise variance. In one illustrative embodiment, $\kappa(a,b)=\theta(\Theta_0+\Theta_1 a+\Theta_2 a^2)$ where $\Theta_0, \Theta_1,$ and $\Theta_2$ are predetermined parameters.

According to a further aspect of the invention, $\kappa(\cdot)$ may be a function using the neighboring pixels to estimate noise variance. In one illustrative embodiment, $\kappa(a,b)=\theta(\Theta_0+\Theta_1 b+\Theta_2 b^2)$.

According to a yet another aspect of the invention, $\kappa(\cdot)$ may be a function using a combination of the pixel under consideration and the neighboring pixels to estimate noise variance. In one illustrative embodiment, $\kappa(a,b)=\theta(\Theta_0+\Theta_1 c+\Theta_2 c^2)$, wherein the term $c=(w_a a+w_b b)/(w_a+w_b)$ and wherein $w_a$ and $w_b$ are predetermined weights associated with pixels a and b, respectively.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

To speed-up the filtering process while achieving similar noise smoothing performance as the above prior solution, the proposed solution uses the edge-sensing function $f(\cdot)$ with a data-adaptive scaling function $\kappa(\cdot)$, as follows:

$$f(a,b) = \frac{1}{1 + (a-b)^2/\kappa(a,b)^2} \quad (3)$$

Following the notation used in Equation (1), the terms a and b denote the actual pixel and its neighbor, respectively.

Since anisotropic diffusion is typically used in denoising applications, it is reasonable that $\kappa(\cdot)$ reflects characteristics of noise present in the image. One possible solution is to estimate the noise level from the image and then reflect this estimate in the design of $\kappa(\cdot)$. However, this approach may be too slow and complex, and may be accompanied with an estimation error that can lead to insufficient noise suppression when the noise level is underestimated or excessive smoothing when the noise level is overestimated. Therefore, a more practical solution, at least when it comes to imaging devices and systems with known noise characteristics, is to evaluate image noise during sensor calibration and them characterize this noise using the corresponding mathematical model.

For example, in practice, noise variance can be characterized using the quadratic model with parameters $\Theta_0$, $\Theta_1$, and $\Theta_2$ as follows:

$$\kappa(a,b)=\theta(\Theta_0+\Theta_1 a+\Theta_2 a^2) \quad (4)$$

where $\theta$ is a scaling factor that can be used to control the amount of denoising. Namely, stronger smoothing effects can be obtained by increasing the value of $\theta$ whereas better preservation of image details can be obtained by decreasing the value of $\theta$. In general, parameter $\theta$ can be predetermined, or controlled by the user, or even calculated adaptively using the statistics of the image under consideration. Example values of quadratic model parameters obtained in calibration can be set as $\Theta_0=2.140387$, $\Theta_1=0.027064$, and $\Theta_2=0.000017$. Scaling parameter $\theta$ can usually range from 0.1 to 10. Specific values of these design parameters may vary depending on the image sensor characteristics, image quality requirements, application constraints, etc.

Figure 1:
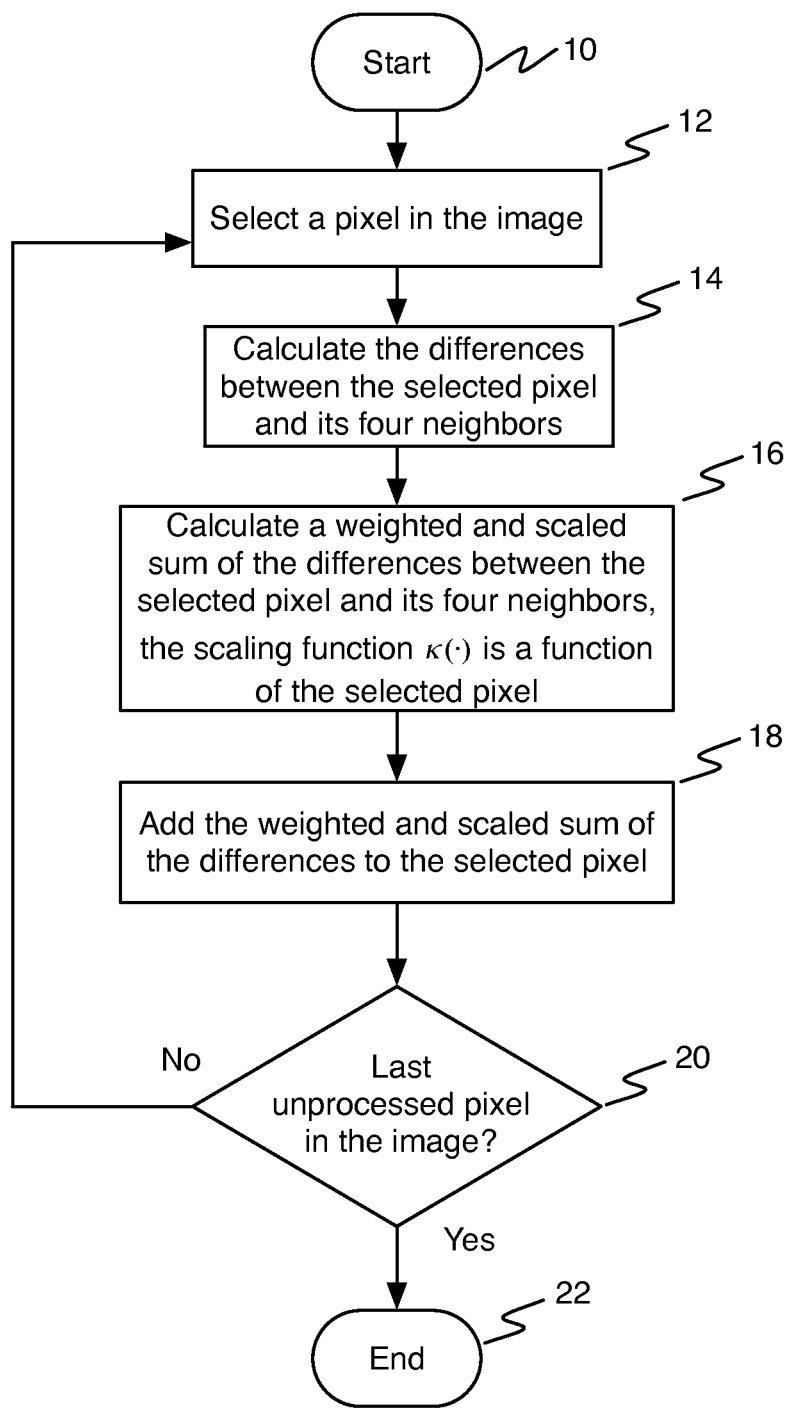
FIG. 1 is a flow diagram showing an illustrative method for performing fast detail-preserving filtering of an input digital image according to one aspect of the present invention.

Referring now to FIG. 1, a flow diagram shows an illustrative method for performing fast detail-preserving filtering of an input digital image according to one aspect of the present invention wherein the scaling factor is a function of the selected pixel. The process begins at reference numeral 10. At reference numeral 12, a pixel in the image is selected for processing. At reference numeral 14, the differences between the selected pixel and its neighbors above, below, to the right, and to the left are calculated.

At reference numeral 16, a weighted and scaled sum of the differences between the selected pixel and its four neighbors is calculated, with the scaling function $\kappa(\cdot)$ being a function of the selected pixel. At reference numeral 18, the weighted and scaled sum of the differences is added to the selected pixel.

At reference numeral 20, it is determined whether the selected pixel was the last unprocessed pixel in the digital image. If so, the process ends at reference numeral 22. If the selected pixel was the not last unprocessed pixel in the digital image, the process returns to reference numeral 12, where another pixel in the image is selected for processing. If more than one iteration is to be performed, then the filtered image produced at reference numeral 22 is used in the subsequent iteration as the input image at reference numeral 10 and the whole filtering procedure (reference numerals 12 to 20) is repeated again.

Equation (4) shows an example of the scaling function $\kappa(\cdot)$ that uses the pixel under consideration to estimate the noise variance. Since this sample is shared for all $(g,h)\epsilon\zeta$, Equation (4) needs to be calculated only once per pixel location $(r,s)$ denoised by Equation (1). Alternative solutions can use the neighboring pixels instead, resulting in $$\kappa(a,b)=\theta(\Theta_0+\Theta_1 b+\Theta_2 b^2) \quad (5)$$

or the combination of the actual pixel a and its neighbor b as follows:

$$\Theta(a,b)=\theta(\Theta_0+\Theta_1 c+\Theta_2 c^2), \text{ with } c=(w_a a+w_b b)/(w_a+w_b) \quad (6)$$

where $w_a$ and $w_b$ are the weights associated with pixels a and b, respectively. Note that this invention is not limited to the above examples, as it can work with some other forms of the scaling function $\kappa(\cdot)$.

Figure 2:
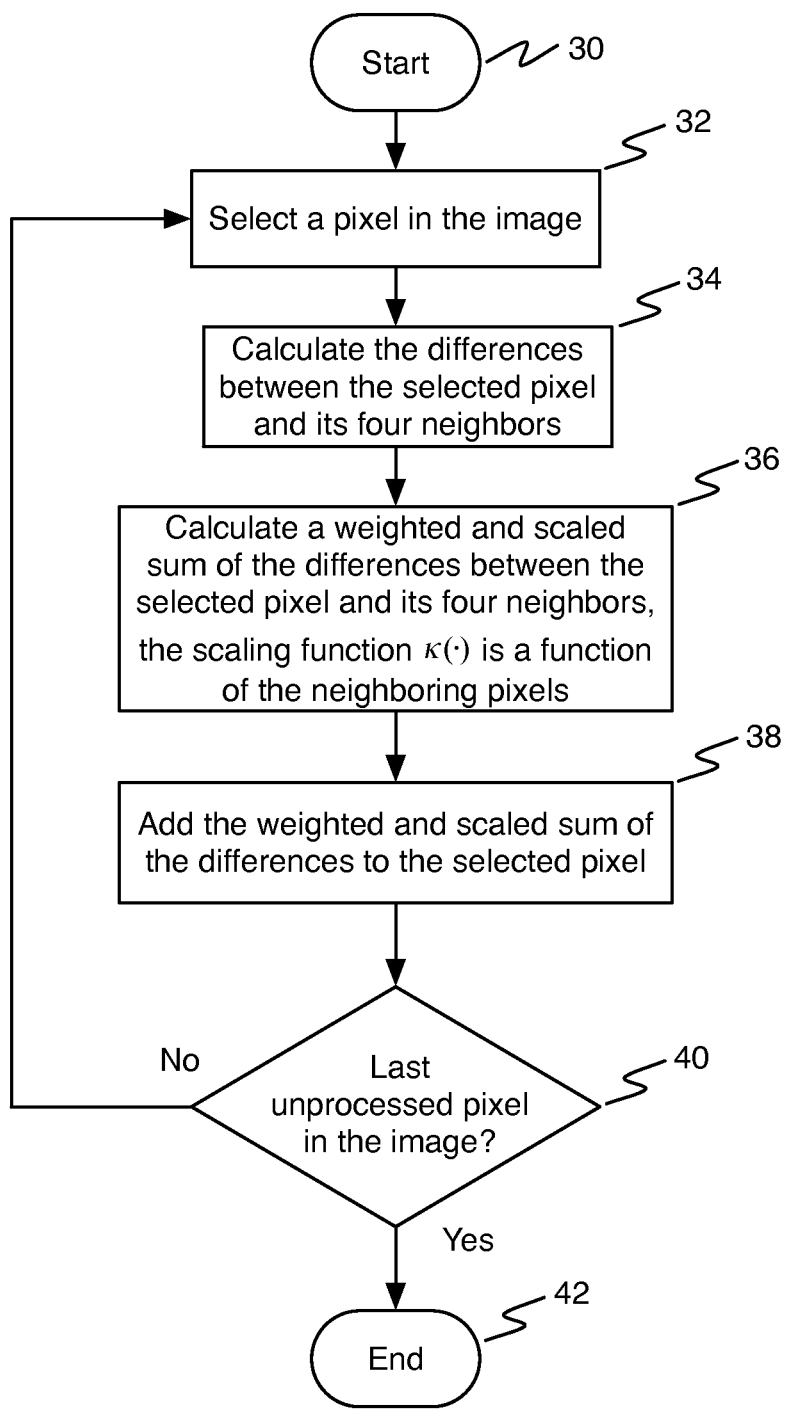
FIG. 2 is a flow diagram showing an illustrative method for performing fast detail-preserving filtering of an input digital image according to another aspect of the present invention.

Referring now to FIG. 2, a flow diagram shows an illustrative method for performing fast detail-preserving filtering of an input digital image according to another aspect of the present invention wherein the scaling factor is a function of the neighboring pixels. The process begins at reference numeral 30. At reference numeral 32, a pixel in the image is selected for processing. At reference numeral 34, the differences between the selected pixel and its neighbors above, below, to the right, and to the left are calculated.

At reference numeral 36, a weighted and scaled sum of the differences between the selected pixel and its four neighbors is calculated, with the scaling function $\kappa(\cdot)$ being a function of the neighboring pixels. At reference numeral 38, the weighted and scaled sum of the differences is added to the selected pixel.

At reference numeral 40, it is determined whether the selected pixel was the last unprocessed pixel in the digital image. If so, the process ends at reference numeral 42. If the selected pixel was the not last unprocessed pixel in the digital image, the process returns to reference numeral 32, where another pixel in the image is selected for processing. If more than one iteration is to be performed, then the filtered image produced at reference numeral 42 is used in the subsequent iteration as the input image at reference numeral 30 and the whole filtering procedure (reference numerals 32 to 40) is repeated again.

Figure 3:
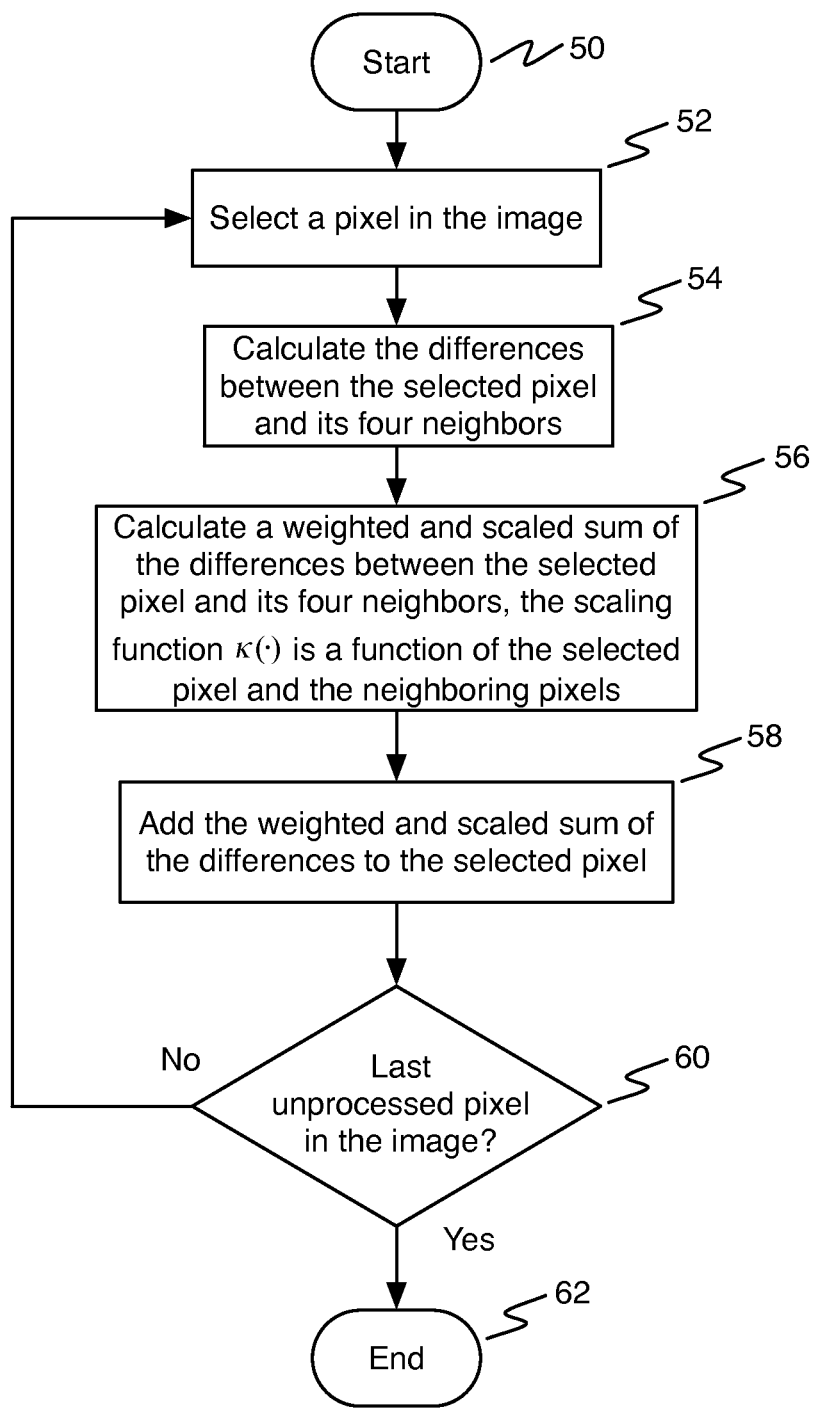
FIG. 3 is a flow diagram showing an illustrative method for performing fast detail-preserving filtering of an input digital image according to another aspect of the present invention.

Referring now to FIG. 3, a flow diagram shows an illustrative method for performing fast detail-preserving filtering of an input digital image according to another aspect of the present invention wherein the scaling factor is a function of the selected pixel and its neighbors. The process begins at reference numeral 50. At reference numeral 52, a pixel in the image is selected for processing. At reference numeral 54, the differences between the selected pixel and its neighbors above, below, to the right, and to the left are calculated.

At reference numeral 56, a weighted and scaled sum of the differences between the selected pixel and its four neighboring pixels is calculated, with the scaling function $\kappa(\cdot)$ being a function of the selected pixel and its neighbors. At reference numeral 58, the weighted and scaled sum of the differences is added to the selected pixel.

At reference numeral 60, it is determined whether the selected pixel was the last unprocessed pixel in the digital image. If so, the process ends at reference numeral 62. If the selected pixel was the not last unprocessed pixel in the digital image, the process returns to reference numeral 52, where another pixel in the image is selected for processing. If more than one iteration is to be performed, then the filtered image produced at reference numeral 62 is used in the subsequent iteration as the input image at reference numeral 50 and the whole filtering procedure (reference numerals 52 to 60) is repeated again.

In case of color images, a straightforward extension of the method of the present invention is to apply the method of the present invention to each color channel separately. Advanced solutions, with the focus on preserving the color correlation, should use a vector form of Equation (3). In one example, $(a-b)^2/\kappa(a,b)^2$ in Equation (3) can be replaced by the sum or average value of $(a-b)^2/\kappa(a,b)^2$ values obtained for each color channel. In another example, $(a-b)^2$ can be replaced with a distance or similarity measure, such as the Euclidean distance or the Minkowski metric, for quantifying the difference between two color vectors. The value obtained using this distance measure should be scaled by the sum or average value of $\kappa(a,b)^2$ obtained for each color channel. These advanced solutions ensure consistent processing across color channels due to using consistent weights for each color component at the pixel location being filtered.

Figure 4:
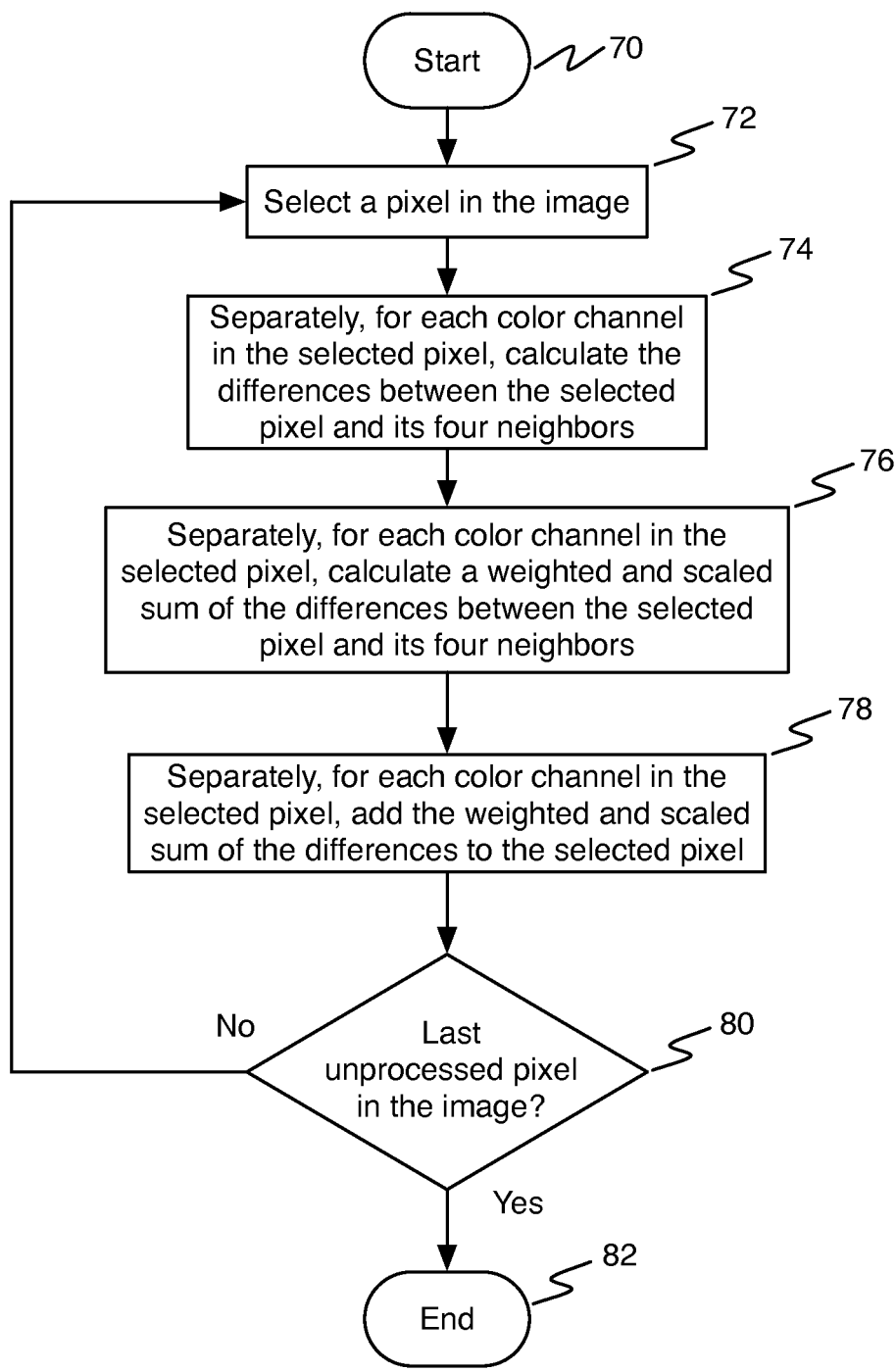
FIG. 4 is a flow diagram showing an illustrative method for performing fast detail-preserving filtering of an input color digital image according to another aspect of the present invention.

Referring now to FIG. 4, a flow diagram shows an illustrative method for performing fast detail-preserving filtering of an input digital image according to one aspect of the present invention wherein the scaling factor is a function of the selected pixel. The process begins at reference numeral 70. At reference numeral 72, a pixel in the image is selected for processing. At reference numeral 74, the differences between the selected pixel and its neighbors above, below, to the right, and to the left are calculated.

At reference numeral 76, a weighted and scaled sum of the differences between the selected pixel and its four neighbors is calculated, with the scaling function $\kappa(\cdot)$ being a function of the selected pixel. At reference numeral 78, the weighted and scaled sum of the differences is added to the selected pixel.

At reference numeral 80, it is determined whether the selected pixel was the last unprocessed pixel in the digital image. If so, the process ends at reference numeral 82. If the selected pixel was the not last unprocessed pixel in the digital image, the process returns to reference numeral 72, where another pixel in the image is selected for processing. If more than one iteration is to be performed, then the filtered image produced at reference numeral 82 is used in the subsequent iteration as the input image at reference numeral 70 and the whole filtering procedure (reference numerals 72 to 80) is repeated again.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for creating an output digital image by performing fast detail-preserving filtering of an input digital image comprising:
   a) selecting a pixel a from the input digital image, pixel a not being in a row or column at the boundary of the image;
   b) calculating the difference between the selected pixel and each of its four neighboring pixels located above, left, right, and below the selected pixel;
   c) calculating a scaled weighted sum of differences between the selected pixel and its four neighbors, the difference being scaled by a data-adaptive scaling function using the pixel under consideration to estimate noise variance, where for each neighboring pixel b the weight is a function $f$ of the difference between the selected pixel a and its neighboring pixel b under consideration, where $$f(a,b) = \frac{1}{1+(a-b)^2/\kappa(a,b)^2},$$

the data-adaptive scaling function being $\kappa(a,b)=\theta(\Theta_0+\Theta_1 a+\Theta_2 a^2)$ where $\theta$ is a scaling factor, and where $\Theta_0$, $\Theta_1$, and $\Theta_2$ are quadratic model parameters;
   d) adding the weighted sum of differences to the value of the selected pixel; and
   performing a) through d) for each pixel in the input digital image that is not in a row or column at the boundary of the image.

2. A method for creating an output digital image by performing fast detail-preserving filtering of an input digital image comprising:
   a) selecting a pixel a from the input digital image, pixel a not being in a row or column at the boundary of the image;
   b) calculating the difference between the selected pixel and each of its four neighboring pixels located above, left, right, and below the selected pixel;
   c) calculating a scaled weighted sum of differences between the selected pixel and its four neighbors, the difference being scaled by a data-adaptive scaling function using the neighboring pixels to estimate noise variance, where for each neighboring pixel b the weight is a function $f$ of the difference between the selected pixel a and its neighboring pixel b under consideration, where $$f(a,b) = \frac{1}{1+(a-b)^2/\kappa(a,b)^2},$$

the data-adaptive scaling function being $\kappa(a,b)=\theta(\Theta_0+\Theta_1 b+\Theta_2 b^2)$ where $\theta$ is a scaling factor, and where $\Theta_0$, $\Theta_1$, and $\Theta_2$ are quadratic model parameters;
   d) adding the weighted sum of differences to the value of the selected pixel; and
   performing a) through d) for each pixel in the input digital image that is not in a row or column at the boundary of the image.

3. A method for creatin an output digital image by performing fast detail-preserving filtering of an input digital image comprising:
   a) selecting a pixel a from the input digital image, pixel a not being in a row or column at the boundary of the image;
   b) calculating the difference between the selected pixel and each of its four neighboring pixels located above, left, right, and below the selected pixel;
   c) calculating a scaled weighted sum of differences between the selected pixel and its four neighbors, the difference being scaled by a data-adaptive scaling function using a combination of the pixel under consideration and the neighboring pixels to estimate noise variance, where for each neighboring pixel b the weight is a function $f$ of the difference between the selected pixel a and its neighboring pixel b under consideration, where $$f(a, b) = \frac{1}{1 + (a-b)^2 / \kappa(a, b)^2},$$

the data-adaptive scaling function being $\kappa(a,b)=\theta(\Theta_0+\Theta_1 c+\Theta_2 c^2)$ where $\theta$ is a scaling factor, and where $\Theta_0$, $\Theta_1$, and $\Theta_2$ are quadratic model parameters, and the term $c=(w_a a+w_b b)/(w_a+w_b)$, and where $w_a$ and $w_b$ are weights associated with pixels a and b, respectively;

d) adding the weighted sum of differences to the value of the selected pixel; and performing a) through d) for each pixel in the input digital image that is not in a row or column at the boundary of the image.

4. A method for creating an output color digital image by performing fast detail-preserving filtering of an input color digital image comprising:

a) selecting a pixel a from the input color digital image, pixel a not being in a row or column at the boundary of the image;

b) calculating separately for each color channel in the selected pixel the difference between the selected pixel and each of its four neighboring pixels located above, left, right, and below the selected pixel;

c) calculating separately for each color channel in the selected pixel a scaled weighted sum of differences between the selected pixel and its four neighbors, the difference being scaled by a data-adaptive scaling function using the pixel under consideration to estimate noise variance, where for each neighboring pixel b the weight is a function $f$ of the difference between the selected pixel a and its neighboring pixel b under consideration, where $$f(a, b) = \frac{1}{1 + (a-b)^2 / \kappa(a, b)^2},$$

the data-adaptive scaling function being $\kappa(a,b)=\theta(\Theta_0+\Theta_1 a+\Theta_2 a^2)$ where $\theta$ is a scaling factor, and where $\Theta_0$, $\Theta_1$, and $\Theta_2$ are quadratic model parameters;

d) adding separately for each color channel in the selected pixel the weighted sum of differences to the value of the selected pixel; and performing a) through d) for each pixel in the input color digital image that is not in a row or column at the boundary of the image.

5. A method for creating an output color digital image by performing fast detail-preserving filtering of an input color digital image comprising:

a) selecting a pixel a from the input color digital image, pixel a not being in a row or column at the boundary of the image;

b) calculating separately for each color channel in the selected pixel the difference between the selected pixel and each of its four neighboring pixels located above, left, right, and below the selected pixel;

c) calculating separately for each color channel in the selected pixel a scaled weighted sum of differences between the selected pixel and its four neighbors, the difference being scaled b a data-adaptive scaling function using the pixel under consideration to estimate noise variance, where for each neighboring pixel b the weight is a function $f$ of the difference between the selected pixel a and its neighboring pixel b under consideration, where $$f(a, b) = \frac{1}{1 + (a-b)^2 / \kappa(a, b)^2},$$

the data-adaptive scaling function being $\kappa(a,b)=\theta(\Theta_0+\Theta_1 b+\Theta_2 b^2)$ where $\theta$ is a scaling factor, and where $\Theta_0$, $\Theta_1$, and $\Theta_2$ are quadratic model parameters;

d) adding separately for each color channel in the selected pixel the weighted sum of differences to the value of the selected pixel; and performing a) through d) for each pixel in the input color digital image that is not in a row or column at the boundary of the image.

6. A method for creating an output color digital image by performing fast detail-preserving filtering of an input color digital image comprising:

a) selecting a pixel a from the input color digital image, pixel a not being in a row or column at the boundary of the image;

b) calculating separately for each color channel in the selected pixel the difference between the selected pixel and each of its four neighboring pixels located above, left, right, and below the selected pixel;

c) calculating separately for each color channel in the selected pixel a scaled weighted sum of differences between the selected pixel and its four neighbors, the difference being scaled by a data-adaptive scaling function using a combination of the pixel under consideration and the neighboring pixels to estimate noise variance, where for each neighboring pixel b the weight function $f$ of the difference between the selected pixel a and its neighboring pixel b under consideration, where $$f(a, b) = \frac{1}{1 + (a-b)^2 / \kappa(a, b)^2},$$

the data-adaptive scaling function being $\kappa(a,b)=\theta(\Theta_0+\Theta_1 c+\Theta_2 c^2)$ where $\theta$ is a scaling factor, and where $\Theta_0$, $\Theta_1$, and $\Theta_2$ are quadratic model parameters, and the term $c=(w_a a+w_b b)/(w_a+w_b)$, where $w_a$ and $w_b$ are weights associated with pixels a and b, respectively;

d) adding separately for each color channel in the selected pixel the weighted sum of differences to the value of the selected pixel; and performing a) through d) for each pixel in the input color digital image that is not in a row or column at the boundary of the image.

\* \* \* \* \*